Aug. 5, 1969     J. J. CALLAHAN     3,459,217

GARTER CHECK VALVE

Filed March 21, 1966

INVENTOR.
JAMES J. CALLAHAN
BY
McNENNY, FARRINGTON, PEARNE & GORDON

ATTORNEYS

United States Patent Office 3,459,217
Patented Aug. 5, 1969

3,459,217
GARTER CHECK VALVE
James J. Callahan, Mentor, Ohio, assignor, by mesne assignments, to Houdaille Industries, Inc., Buffalo, N.Y., a corporation of Michigan
Filed Mar. 21, 1966, Ser. No. 535,994
Int. Cl. F16k 15/00
U.S. Cl. 137—516.15                    2 Claims

ABSTRACT OF THE DISCLOSURE

A check valve comprising a tubular projection having a continuous cylindrical outer surface and a plurality of axially spaced passages in the surface, an elastic sleeve around the tubular projection sealing the surface and covering the passages to prevent fluid flow into the interior of the tubular projection. The projection is provided with opposed, radially extending faces which are spaced from but engageable with the ends of the sleeve to axially locate the sleeve on the projection and to provide unidirectional passageways from within the interior of the projection. According to another aspect of this invention, the passageways are formed by a porous tube which provides a multitude of small passages.

This invention relates generally to cyclical fluid distribution systems and components thereof. More particularly this invention relates to an improved check valve structure for use in systems for intermittently injecting a lubricant into a pressurized chamber, such as the cylinder of a compressor, actuator, or engine.

In the past, considerable difficulty has been encountered when cyclical lubrication systems have been used to introduce lubricant into pressurized air or gas chambers particularly when such chambers are intermittently pressurized as is the case in compressor cylinders, engine cylinders and actuators of the piston and cylinder type.

In such installations it is necessary to provide a check valve which functions with absolute reliability to prevent flow of the air or gas back into the lubrication system. Various types of check valves have been installed in such systems including ball type valves with hard and soft seats. However, such valves have failed to perform their function with sufficient reliability to eliminate the problem. The presence of even minute particles of dirt or other foreign matter causes such valves to leak. Further, it appears that in some instances back flow of the gas occurs before the valve can reseat after it has opened for lubricant flow. Because of these difficulties it has been customary, in many installations, to connect two separate check valves in series. Such a solution to the problem, however, is undesirable since it increases the cost of the system and depends for its success on the probability that one or the other of the valves will properly function at any given time.

A check valve incorporating the present invention has been found to operate with sufficient speed of response and sufficient reliability to virtually eliminate this problem. Two embodiments of this invention are illustrated. In both embodiments a garter valve element of elastic material, such as rubber, is stretched around a cylindrical surface provided with a plurality of flow passages. A substantial sealing area is provided between the garter sealing element and the cylindrical surface so the presence of small particles of dirt, or the like, does not result in leakage.

In both embodiments the combined areas of the flow passages when compared to the circumferential length of the cylindrical sealing surface is sufficiently small so that the radial deflection of the garter sealing element is small even under maximum rates of lubricant flow. Consequently, the reseating of the sealing element is almost instantaneous and back flow of the gas cannot occur. Such rapid response is also achieved because the sealing element has a relatively high elastic sealing force when compared to its weight and resulting inertia. In addition, the axial length of the thin, annular flow path, when compared to its width, is very great. Consequently, compressed gas or air cannot reach the flow passages before sealing occurs.

The first illustrated embodiment is intended for use in systems wherein the cylinder pressure is not in excess of three thousand pounds per square inch. In this embodiment the flow passages are formed by cross drilling. The second embodiment utilizes a porous sleeve to support the garter sealing element and is intended for use in systems for lubricating the chambers for cylinders and the like when chamber pressure is relatively high. For example, such a valve could be used when chamber pressure is in the order of three thousand to six thousand pounds per square inch.

Both illustrated embodiments of this invention provide a tubular projection extending into a housing member cooperating with the projection to define an annular chamber around the projection. The annular chamber is connected to the chamber to be lubricated and the interior of the tubular projection is connected to the source of lubricant. The wall of the tubular projection is formed with a plurality of passages therethrough which are normally closed by a garter type, imperforate, elastic sleeve. This sleeve serves as the back check valve element to prevent reverse flow from the annular chamber into the central passage. However, flow in the opposite direction from the central passage to the annular chamber occurs when a sufficient pressure differential is present therebetween. The garter element may be formed of any suitable elastic, rubber-like material, such as buna rubber. The elements are proportioned so that a substantial sealing area is provided which produces a dead-tight seal against back or reverse flow even when particles of dirt or other foreign matter are present between the projection and garter element.

It is an important object of this invention to provide a novel and improved check valve structure particularly suited for use in cyclical fluid distribution systems for intermittently injecting liquid into a pressurized chamber.

It is another important object of this invention to provide a novel and improved garter type check valve particularly adapted for use in systems wherein lubricant is intermittently injected into a pressurized chamber, such as the cylinder chamber of a compressor, engine or actuator.

It is still another object of this invention to provide a novel and improved check valve structure including a tubular projection formed with a plurality of passages through the wall thereof in combination with an imperforate, resilient, garter type sealing element adapted to seal against the exterior surface of the projection and prevent reverse flow through the valve.

Another important object of this invention is to provide a novel and improved check valve according to the last preceding object wherein the total area of passages when compared to the circumferential length of the sealing surface is sufficiently small so that full flow is provided with relatively small radial deflections of the garter sealing element.

It is still another object of this invention to provide a novel and improved check valve, according to the last preceding object, wherein the projection is formed of a tubular sintered porous material providing a multitude of very small passages through the wall of the projection.

Further objects and advantages will appear from the following description and drawings wherein.

Figures 1, 1A, 2:
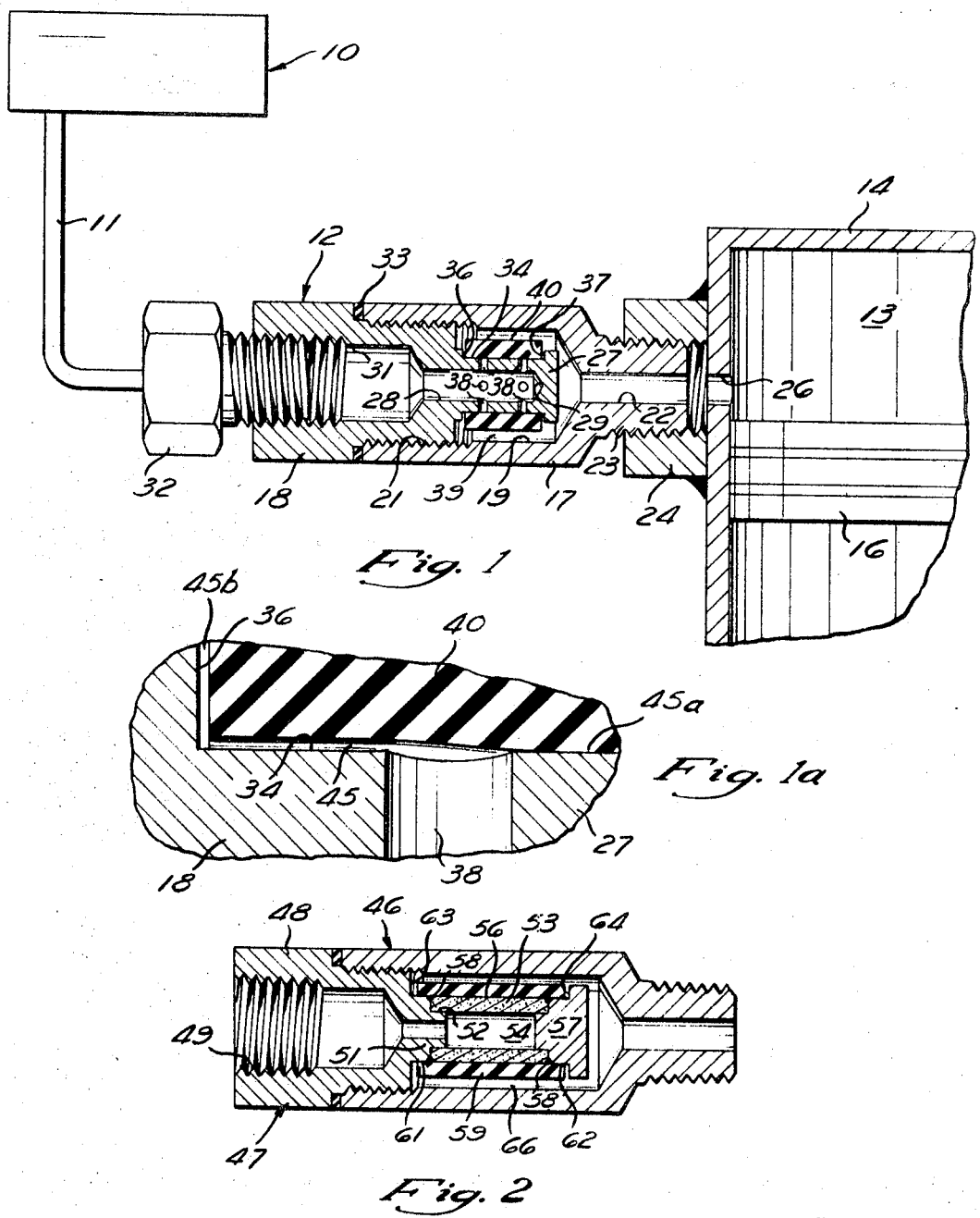
FIGURE 1 is a side elevation in longitudinal section of one embodiment of check valves incorporating this invention illustrated as it would be connected to a cyclical lubrication system for lubricating a cylinder chamber subjected to pressure fluctuations or pulsations.
FIGURE 1a is an enlarged fragmentary section of the valve of FIGURE 1.
FIGURE 2 is a side elevation in longitudinal section of a second embodiment of this invention wherein the check valve is provided with a sintered, porous, tubular element.

As used herein the term "cyclical distributors" includes distributors of the type shown, for example, in United States Patents Re. 21,236; 2,718,281; and 2,792,911, in which lubricant is received in a main inlet and is discharged in endless predetermined sequence through a number of outlets to a number of corresponding branch lines. In such system lubricant under pressure is intermittently supplied to each branch line and the system is arranged to automatically program the intermittent flow so that each branch line receives a measured amount of pressurized lubricant and, as a result, the item or mechanism lubricated by each branch line is lubricated in a predetermined manner. A check valve incorporating the present invention is provided in each branch line adjacent to the chamber being lubricated by the particular branch line.

In FIGURE 1 the lubrication supply system 10 is schematically illustrated. It intermittently supplies lubricant under pressure to a branch line 11. The branch line 11 is connected through a check valve 12 to a chamber 13 of a cylinder 14 having a reciprocating piston 16 therein. The cylinder 14 and piston 16 schematically illustrate a piston cylinder type gas compressor.

The valve body assembly includes a body member 17 and a stem member 18. The body member 17 is provided with a main bore 19 threaded at its outer end 21 and connecting with a reduced diameter coaxial bore 22 through a nipple portion 23. The nipple portion 23 is threaded into a suitable fitting 24 on the cylinder 14 with the bore 22 open to the chamber 13 through a passage 26.

The stem member 18 is threaded into the body member 17 and is provided with a tubular projection 27 centrally positioned in the bore 19. A central passage 28 in the projection 27 is closed by an end wall 29. The opposite end of the passage 28 is open to a threaded passage 31 which receives a fitting 32 mounted on the end of the branch line 11. A gasket 33 provides a seal between the two members 17 and 18.

The exterior wall of the projection 27 is formed with a reduced diameter cylindrical outer wall 34 and opposed radial walls 36 and 37 at each end thereof. An elastic garter member 40 extends around the cylindrical wall 34 and is axially located on the projection 27 by the radial walls 36 and 37. This garter element 40 may be formed of any suitable elastic material which has physical properties compatible with the fluids of the system and which provides adequate sealing properties. In practice it has been found that buna rubber garter elements function well in many installations.

The projection 27 is formed with a plurality of radially extending passages 38 extending through the wall from the bore 28 to the cylindrical surface 34. In the embodiment of FIGURE 1 there are two pairs of cross passages 38 symmetrically located with respect to the garter element 40 formed by drilling cross bores at right angles to each other. Therefore, there are eight passages connecting the bore 28 and the cylindrical surface 38, with four located on either side of the central section of the garter element 40. The garter element 40 is proportioned so that when it is installed it is stretched from its unstressed condition so that the elastic property of the material forming the garter element causes it to resiliently engage the cylindrical surface. This resilient force of engagement maintains the garter element in sealing engagement with the cylindrical wall 34 and is augmented by fluid induced forces when the pressure in the annular chamber 39 exceeds the pressure in the bore 28. When the pressure in the bore 28 exceeds the pressure in the annular chamber 39, by a sufficient amount to overcome the elastic force of the garter element 40, the fluid in the ports 38 deflect the garter element away from the cylindrical wall 34 and permits flow of the lubricant out through the passage 38 into the chamber 39 and therefrom into the chamber 13 of the cylinder 14.

The proportions of the garter element 40 and the spacing between the radial walls 36 and 37 are such that the garter element is axially located on the projection 27 but flow is permitted therebetween when the garter element is deflected from its seated position. Because the flow path from the passages 38 around the garter element 40 is annular and has a substantial peripheral length a relatively small amount of deflection of the garter element 40 permits substantial flow of lubricant. However, reverse flow is prevented completely and a dead-tight seal is provided to prevent such reverse flow because the gas would have to pass for considerable length along the annular flow path and cannot reach the passages 38 before the garter element 40 reseats.

FIGURE 1a illustrates the operation of the valve when lubricant is flowing. The pressure of the lubricant in the passage 38 causes the ends of the garter element 40 to deflect away from the surface 34 and produce an annular flow path 45. Because the circumferential length of the surface 34 is relatively long, when compared to the total cross-sectional area of the passages adjacent to each end, a very small radial deflection of the garter element 40 accommodates full lubricant flow. Because the zone of the projection 27 at the central portion of the garter element 40 is free of passages the garter element 40 remains in contact with the cylindrical wall 34 at 45a between the axially spaced ports 38.

An inspection of FIGURE 1a illustrates that the axial length of the annular flow path 45 is long compared to its width. Therefore, large particles of foreign matter cannot penetrate and small particles do not result in leakage. Also, the garter element responds very quickly to pressure reversals, so gas or air cannot reach the passages 38 before the garter element reseats. The garter element 40 and the radial walls 36 and 37 are proportioned so that a clearance 45b is provided at each end of the garter element. Preferably the clearance 45b has a cross-sectional area at least equal to the area of the adjacent flow path 45, so that a restriction does not occur at this point. The flow through the opposed clearances 45b tends to center the garter element. In the embodiment of FIGURE 1 the radial thickness of the garter element 40 is about twice the radial extent of the radial walls 36 and 37.

The embodiment of FIGURE 2 is intended for use in systems wherein relatively high back pressures are encountered. Here again, the check valve 46 is arranged so that it can be threaded into a suitable port in a cylinder and a fitting similar to the fitting 32 can be threaded into the end of the check valve to connect the check valve to a branch line of the lubrication system. In this embodiment the stem member 47 is formed of three pieces permanently assembled during the manufacture. This assembly includes a body element 48 threaded at 49 to receive a fitting 32 and formed with a projection 51 having a cylindrical wall 52 extending into the central bore of a tubular porous element 53. The porous element 53 is preferably formed of sintered metal providing a multitude of extremely small passages between the central chamber 54 and the cylindrical exterior wall 56. An end member 57 is mounted on the tubular element 53 to close the end opposite the body member 48. A permanent assembly is provided by any suitable means such as welding, brazing or the like, at 58 between the tubular element 53 and both the body element 48 and end member 57.

An elastic, imperforate, garter element 59 extends around the porous element 53 and is proportioned to engage and seal with the cylindrical surface 61 at one end of the porous member and similarly engage and seal with the cylindrical surface 62 at the other end of the porous element. The garter element 59 is axially located between opposed radial faces 63 and 64. The axial spacing of the faces 63 and 64 is slightly greater than the length of the garter element. However, the elements are proportioned so that in the event that the garter element moves along the tubular element into engagement with the radial surface 63 the opposite end still engages and seals with the cylindrical surface 62. Conversely, when the garter element engages the radial surface 64 it still overlaps and provides sealing engagement with the cylindrical surface 61.

Here again, the garter element is deflected from its sealing condition when the pressure of the lubricant in the chamber 54 is greater than the pressure in the annular chamber 66 and flow of the lubricant from the chamber 54 into the chamber 66 is permitted. However, reverse flow is prevented by a dead-tight seal between the garter element and the respective surfaces 61 and 62. Here again, the annular flow path has a substantial circumferential length, so relatively small deflections of the garter valve permit substantial lubricant flow. Therefore, the garter element reseats without any substantial movement and reverse flow is positively prevented.

In both embodiments the garter elements 40 and 59 are formed of relatively soft material, so that a particle of dirt or other foreign matter will not cause leakage even if it penetrates into the sealing area. Also, the sealing area in both embodiments is relatively large so the presence of a particle of dirt or other foreign matter does not result in a leakage path. Because the passages through the porous element 53 are extremely small the garter element 59 is adequately supported even when the pressure in the annular chamber 66 is extremely high.

A check valve incorporating the present invention has been found to function with complete reliability in installations which have in the past required two check valves coupled in series.

Although preferred embodiments of this invention are illustrated it is to be understood that various modifications and rearrangements of parts may be resorted to without departing from the scope of the invention as defined in the following claims.

I claim:
1. In a system including a source intermittently operable to deliver fluid under pressure, a chamber subject to fluid pressure, and a check valve connected between said source and chamber, the improvement in said check valve comprising a body assembly formed with a tubular projection providing a continuous cylindrical outer surface, the interior of said projection connecting with said source and said surface connecting with said chamber, the wall of said projection between said interior and said surface being formed with a plurality of axially spaced passages, an elastic imperforate sleeve around said projection normally sealing with said surface and covering said passages to prevent fluid flow from said chamber to said interior, said passages being symmetrically located adjacent to the ends of said sleeve, and the portion of said projection at the central part of said sleeve being free of said passages, said sleeve being deflectable away from said surface in response to pressure in said interior greater than pressure in said chamber to permit flow of fluid through a pair of passageways from said interior to said chamber, and opposed radially extending faces on said projection spaced from but engageable with the ends of said sleeve axially locating said sleeve on said projection, said passageways extending in opposite directions between said sleeve and the wall of said projection and then through the spaces between said sleeve and said faces, the total cross-section of said passages compared to the circumferential length of said cylindrical surface being sufficiently small so that small radial deflection of said sleeve provides an annular flow path with sufficient capacity to accommodate full flow through said passages and said passageways.

2. A system as set forth in claim 1 wherein the axial length of said annular flow path is substantially greater than its width.

References Cited

UNITED STATES PATENTS

| 2,845,090 | 7/1958 | Rost | 137—512.1 XR |
| 3,154,486 | 10/1964 | Weaver | 137—512.1 XR |
| 3,179,124 | 4/1965 | Haring | 137—516.11 |

FOREIGN PATENTS

| 655,368 | 3/1936 | Germany. |
| 853,135 | 10/1952 | Germany. |

WILLIAM F. O'DEA, Primary Examiner
WILLIAM H. WRIGHT, Assistant Examiner

U.S. Cl. X.R.
137—512, 515